Figure 1:
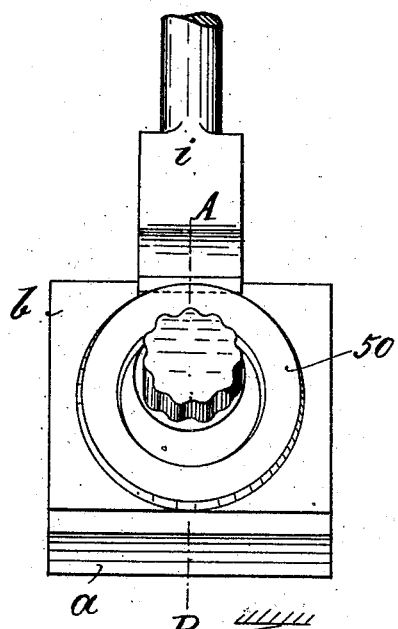

No. 842,500. PATENTED JAN. 29, 1907.
S. SCHNEIDER.
METHOD OF PREPARING RINGS FOR BALL BEARINGS.
APPLICATION FILED JULY 23, 1906.

3 SHEETS—SHEET 1.

Attest
C. R. Thomas
F. B. MacNab

Inventor
S. Schneider
by
Chandlee & Chandlee
Attorneys

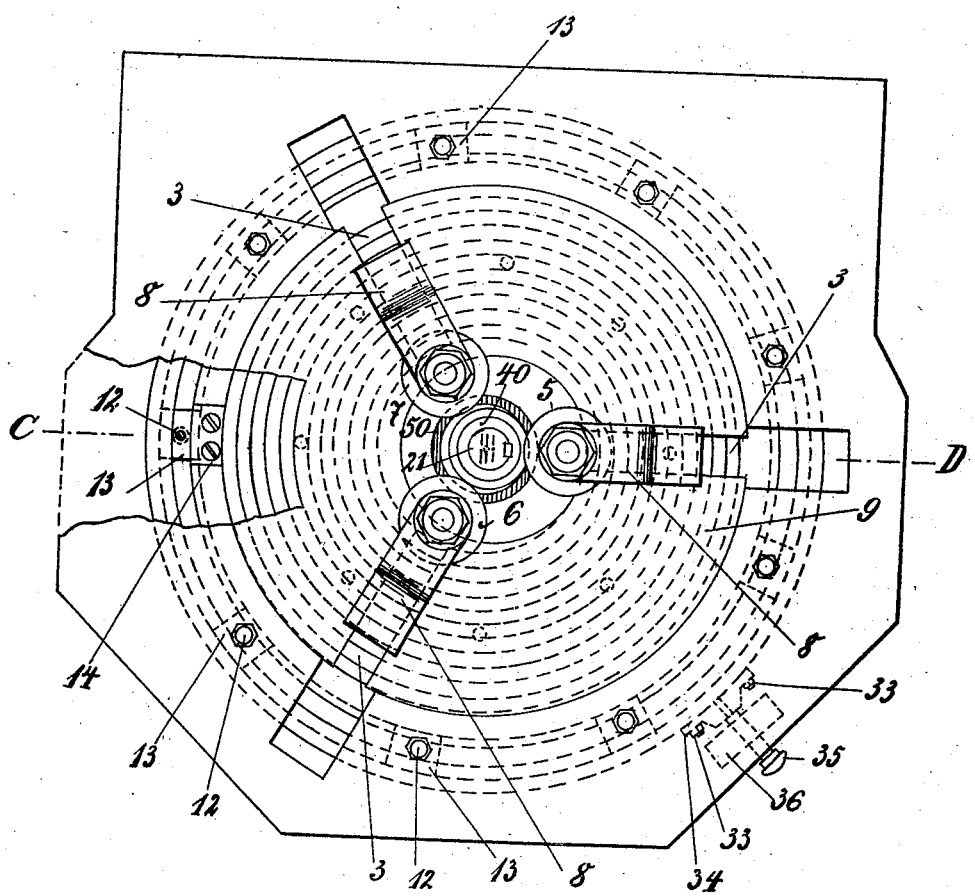

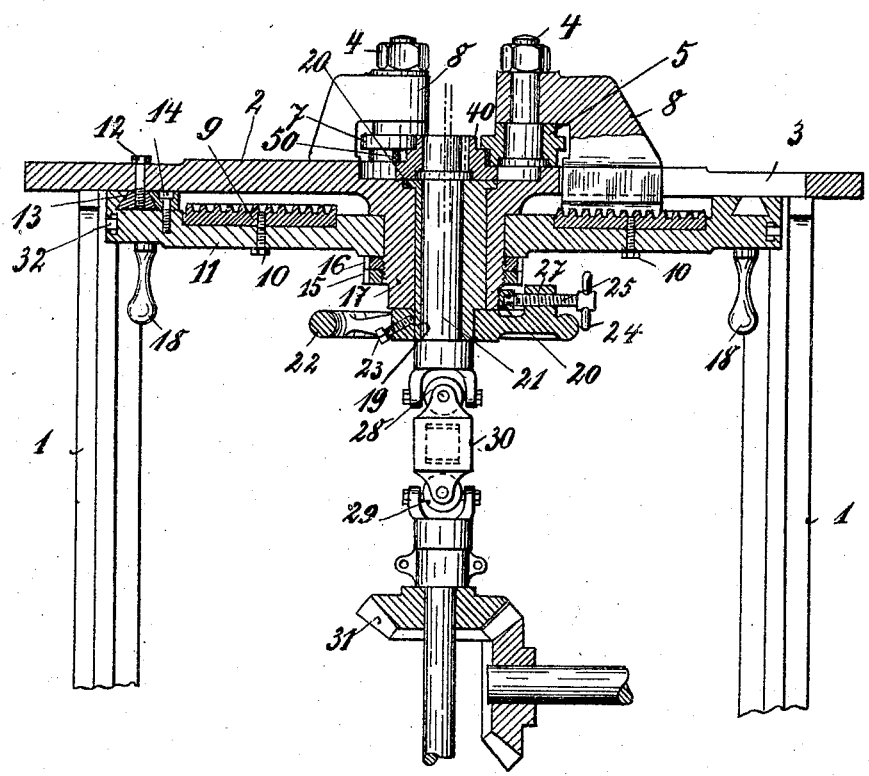

UNITED STATES PATENT OFFICE.

STEFAN SCHNEIDER, OF CHARLOTTENBURG, GERMANY.

METHOD OF PREPARING RINGS FOR BALL-BEARINGS.

No. 842,500.     Specification of Letters Patent.     Patented Jan. 29, 1907.

Application filed July 23, 1906. Serial No. 327,453.

*To all whom it may concern:*

Be it known that I, STEFAN SCHNEIDER, a subject of the Emperor of Germany, and a resident of Charlottenburg, Germany, have invented a certain new and useful Improvement in Methods of Preparing Rings for Ball-Bearings, of which the following is a specification.

The preparation of rings for ball-bearings has heretofore been effected by slicing iron bars of circular section into thin disks and punching rings of various diameters from said disks, said rings being in the size in which they were obtained from the bar, turned in a lathe, hardened and ground, and put in use in this condition. Such mode of preparation involves, however, a considerable waste of material in the form of turnings, and wastage is also occasioned by reason of the fact that the rings formed from the inner part of a disk can only be used for ball-bearing rings of small diameter. According to another known method of preparing rings for other purposes, the rings when formed are expanded by means of mandrels to a predetermined diameter. This operation can only be adopted, however, in the case of rings whereof the shape is the only feature of importance and which are not subjected to considerable stresses whether during the latter operation or in use, for instance, in the case of wedding-rings and the like. By expanding with mandrels stresses are produced in the material, which in the case of wedding-rings and the like constitute no disadvantage, though the case is different when the rings are employed for other purposes. It is also a known practice to produce rings in which first the rough piece of work is expanded by means of mandrels, whereupon the work is rolled out, as in wheel-tires. The adoption of a process similar to the last-named in the preparation of rings for ball-bearings is not a mere analogous application, because rings for ball-bearings in order to meet the requirements must always be hardened and because if only the process for producing wheel-tires were employed for rings for ball-bearings the material would be distorted. The reason for this is that whereas by rolling part of the stresses is neutralized to an extent sufficient for wheel-tires still too considerable a part of the stresses remains to be permissible in ball-bearing rings. Tires do not require to be hardened, and consequently the remaining stresses can be ignored. On the other hand, ball-bearing rings must of necessity be subjected to a hardening process, wherein in case stresses are present in the material distortion of the material will take place to a certainty, while it is well known that the ball-bearing rings must be made extremely precise or they cannot be employed to advantage.

I avoid waste of material and am enabled to apply to ball-bearing rings the operation of increasing the diameter by means of mandrels by removing the stresses produced in the material after the expansion in a manner not heretofore practiced. This neutralization of the stresses is effected by hammering uniformly the entire periphery at uniform regulated distances in radial direction. It is true that it is already known to hammer rings roundabout; but this has not heretofore been accomplished in the manner hereinafter described nor for the purpose presently in view, but rather the hammering was intended only to alter the diameter. It is especially important that I should neutralize the stresses in radial direction, because it is in this direction that distortion of the material has a most prejudicial effect on the ball-bearing. To this end I employ hammer mechanism, which neutralizes the stresses in the rings produced by the mandrel before they are subjected to the further operations of rolling and hardening, and a rolling mechanism having a number of adjustable internal and external rolls, which give the rings their required dimensions and form.

The hammer mechanism works radially on the rotating ring, the hammer being connected, by means of a system of levers and ratchet mechanism, with the preferably inclined support of the work being treated, so that each time the hammer rises the work is fed a suitable amount by intermittently-acting devices.

The devices serving to carry out the process are shown in the annexed drawings, in which—

Figure 3:
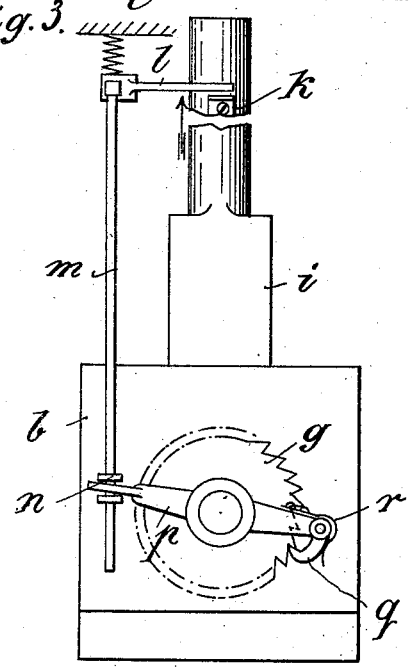
Figure 2:
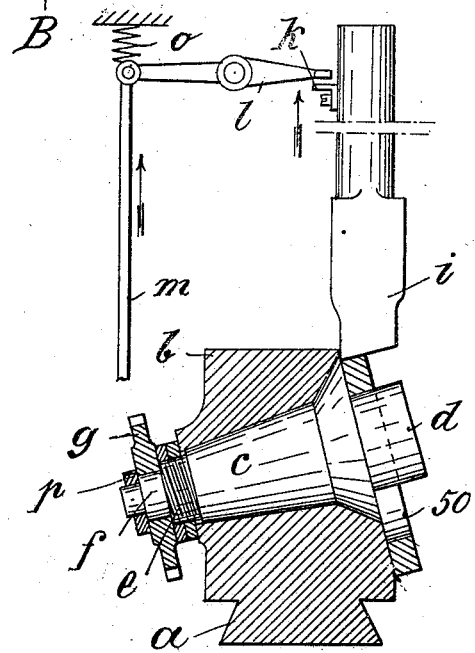

Figure 1 is a front elevation of the hammer; Fig. 2, an end elevation, partly in section, on the line A B of Fig. 1. Fig. 3 is a rear elevation of the parts shown in Fig. 1. Fig. 4 is a plan of the rolling apparatus, and Fig. 5 a section along the line C D of Fig. 4.

The hammer mechanism shown in Figs. 1 to 3 carries on a base of suitable form (not shown) a supporting-block *b*, dovetailed at *a* and having an inclined front face. This block serves to receive a conical pin $c$, which has a projection $d$ at the front and terminates at the rear in a screw-threaded part $e$, with an end piece $f$ closing the same. The latter serves to support a ratchet-wheel $g$, keyed to the pin $c$. The axis of the pin $c$ is perpendicular to the inclined face of the block $b$, so that it is inclined somewhat to the horizontal. The object is that the ring 50 will during the operation rest entirely on the inclined face of the block and be carried securely without auxiliary means by the projecting end $d$ and prevented from movement in axial direction. The projecting part $d$ is preferably fluted, as shown.

The hammer can be operated in any suitable manner. The striking-face of the same is inclined in the direction of the axis of the pin $c$, so as to exert a uniform pressure on the ring. A longitudinally-adjustable lug $k$ is connected to the hammer, which lug when the hammer is raised actuates one arm of a double lever $l$, swinging around a fixed pivot, and so depresses a rod $m$. Two collars $n$ on the lower part of the rod produce vibration of a double lever $p$ on the downward movement of the said rod, said lever $p$ being pivoted to a rearwardly-projecting extension of the pin $c$. At the lower end of the lever $p$ is pivoted a pawl actuated by a spring $r$. The lever $l$ is also provided with a spring $o$, which brings the lever back to its position of rest as soon as the action of the lug $k$ on the lever $l$ ceases.

The operation of the hammer mechanism is as follows: The ring to be treated is set on the fluted projection $d$. When the hammer rises, the levers $l$ and $p$ are vibrated on their pivots and by means of the pawl $q$ the ratchet-wheel is turned through the distance of one or several teeth. The feeding movement of the ratchet can be regulated by vertical adjustment of the lug $k$ or in any other suitable manner. Simultaneously with the movement of the ratchet-wheel $g$ the conical pin $c$ and its projection $d$ are set in rotation, and the latter on account of its fluted formation carries the ring round by friction through a definite amount. At the next operation the striking-face of the hammer comes against an unworked part of the ring, and the operation is repeated. The rings thus preliminarily treated are then subjected to a rolling operation, as hereinafter described.

The material to be rolled is placed between several external rolls and one internal roll. In order that the external rolls may be simultaneously and uniformly adjusted in radial direction, they are arranged on a surface plate provided on its front face with a spiral thread, so that on rotation of the plate the supports, each of which carries one external roll, are moved radially in slots in a disk. Such an arrangement, previously used for quite distinct purposes, has proved particularly valuable in the rolling out of ball-bearing rings which require uniform treatment. The adjustment of the internal roll is obtained by mounting that part of the driving-shaft for the internal roll in an eccentric bush capable of adjustment. The internal roll is employed as the driving-roll.

Referring to Figs. 4 and 5, the rolling apparatus comprises a number of uprights 1, which support a horizontal plate 2. The latter has preferably three radial guides 3, equidistant from one another, for receiving the supports 8, carrying, by means of bolts 4, the external rolls 5, 6, and 7. The guiding-slots 3 are enlarged at their outer ends, so as to enable the supports to be fitted or removed. The lower sides of the supports are screw-threaded and by engaging the spiral thread of an annulus 9 receive a radial movement from the latter. The annulus 9 is preferably secured by studs 10 10 to a horizontal face-plate 11, so as to be rotated therewith on turning the latter. The guidance of the plate 11 is effected by means of the dovetailed annular pieces 13, secured by studs 12 to the plate 2. The guidance of the plate 11 is further effected by means of a nut 16, secured by a nut 15, both of which are screwed on a projecting boss 17, integral with the plate 2. On the base of the plate are a number of handles 18, so as to enable the plate to be turned and the supports to be moved radially. Within the boss 17 is a bush 19, formed, preferably, of brass or other suitable material, which is retained by a flange 20 in a recess in the boss 17. The bush 19 has an eccentric bore for receiving a shaft 21, keyed to the internal roll 40. The bush 19 projects from the lower part of the boss 17, so as to receive a hand-wheel 22, secured by means of screws 23. By rotating the hand-wheel 22 the eccentricity of the shaft 21 and of the internal roll 40 is altered. The hand-wheel is secured in the desired position by a clamp-block 26, secured by means of the spindle 25, having a handle 24. A lug 27 on the hand-wheel 22 serves as a nut for the spindle 25. The actuation of the shaft is effected, preferably, through the intermediary of two universal joints 28 29, between which is a shaft portion 30. Power is transmitted from a motor in the usual way, the drawings showing bevel-gearing for this purpose.

To secure the plate 11 in position, the plate 11 is provided on its outer cylindrical face with a groove 32, entered by the heads and stems of two screws 33, which press the block 34 against the periphery of the plate 11. A conical perforation in the block serves to receive the point of a pin 35, which by means of a small support 36 is secured to the lower side of the plate 2. By withdrawing the pin 35 from the conical perforation the plate 11 is freed, so that a new movement of the plate is possible. When the desired position is obtained, it is sufficient to press in the pin 35 to secure the plate in its desired position.

After the ball-bearing ring 50 has been made ready for the rolling operation the same is fitted in the rolling apparatus so that the three external rolls 5, 6, and 7 make contact simultaneously with its outer face. The number of external rolls may of course be varied; but the treble arrangement is preferable, so as to obtain accurate adjustment. The adjustment of the external rolls according to the size of the ring is effected by turning the plate 11, and when the external rolls are in the desired position the inner roll 40 is adjusted to suit by turning hand-wheel 22 until the inner roll bears against the inner face of the ring. The position of the internal roll must be such that the same lies radially of one of the three external rolls. The internal roll thus forms the pressure-roll. The oppositely-disposed roll (in the position shown in Fig. 4 the roll 5) forms the counter-pressure roll. The rolls 6 and 7 serve as guide-rolls. After the position of the external and internal rolls has been determined the plate 11 and the hand-wheel 22 are secured in the manner described.

The rolling apparatus is set in motion in the usual manner.

According to the height and cross-section of the ring to be treated, rolls of different profile may be employed. For instance, the embodiment shown in Figs. 4 and 5 shows an annular rib on the periphery of each external roll which engages over the material to be rolled, while on the lower part of the internal roll a rib is provided serving as a support for the ring.

If the supports are not suited for supporting rings of the desired size and form, then as well as changing the rolls the supports carrying the same may also be changed and are removed by slipping them through the enlarged portions of the slots 3.

It will be seen that a double adjustment is provided for. The construction is such that without varying the axial position of the inner roll 40 the external rolls 5, 6, and 7 can be simultaneously adjusted radially and that without varying the axial position of the rolls 5, 6, and 7 the inner roll may be adjusted radially. Thus it is possible to effect simultaneous adjustment of all the rolls. This is of importance in the production of ball-bearing rings, as in this way the frequently-recurring requirement of being able with a definite internal diameter to vary the external diameter, and vice versa, is simply and satisfactorily met. In this way it is possible by using a single apparatus to produce in minimum time the required number of sizes of rings.

Having now described my invention, what I claim, and desire to secure by Letters Patent of the United States, is—

The herein-described method of preparing ball-bearing rings, consisting in perforating a metal disk, expanding the perforation, hammering the perforated disk uniformly in radial direction so as to neutralize internal stresses in said disk, and rolling said perforated disk to form a finished ring.

In testimony whereof I have signed my name to this specification in the presence of two subscribing witnesses.

STEFAN SCHNEIDER.

Witnesses:
WOLDEMAR HAUPT,
HENRY HASPER.